Aug. 14, 1962     J. M. HARRER ET AL     3,049,487
DIRECT-CYCLE, BOILING-WATER NUCLEAR REACTOR
Filed May 6, 1960                        3 Sheets-Sheet 1

INVENTORS
Joseph M. Harrer
Leonard W. Fromm, Jr.
Verne M. Kolba
By:
Attorney

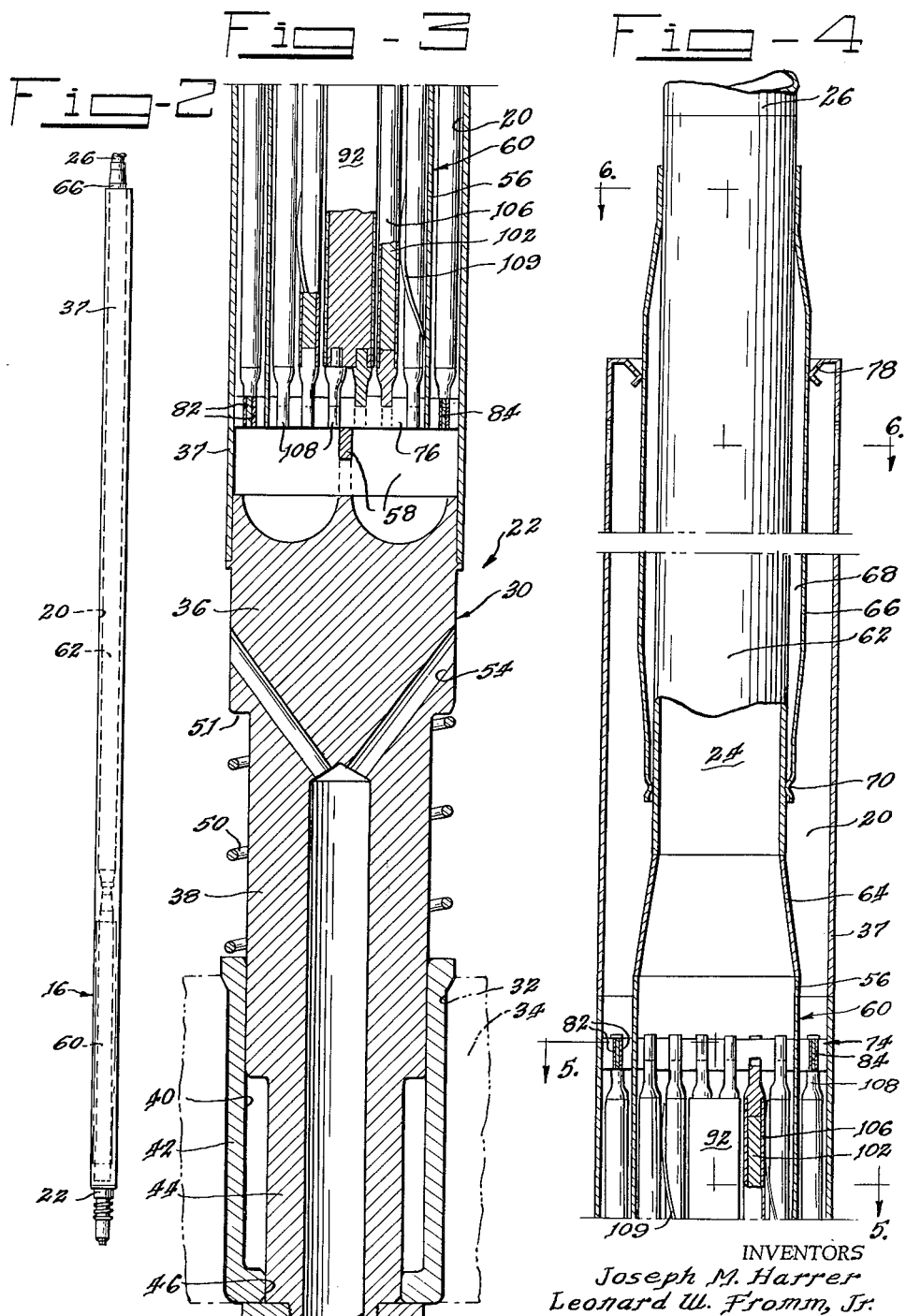

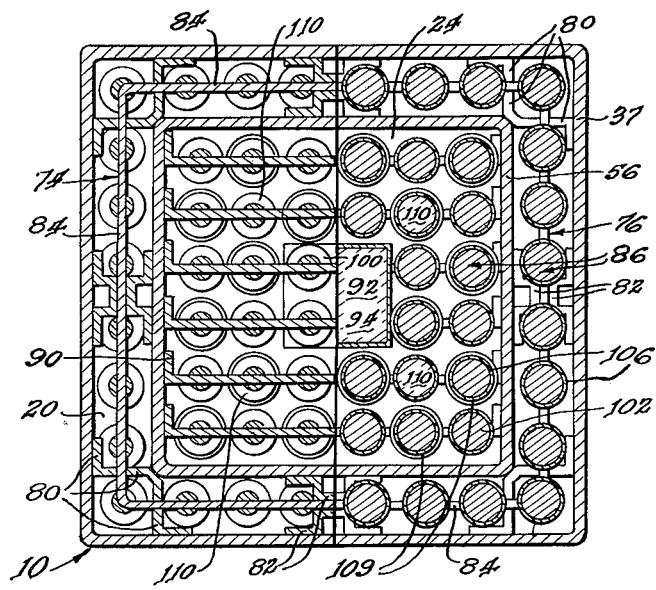
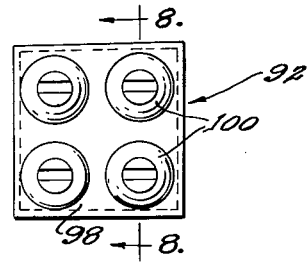
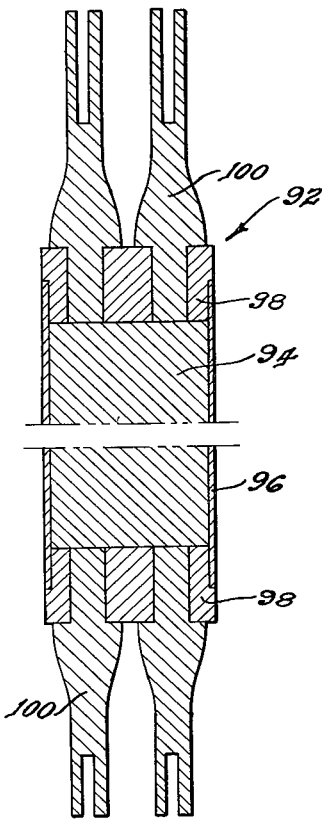
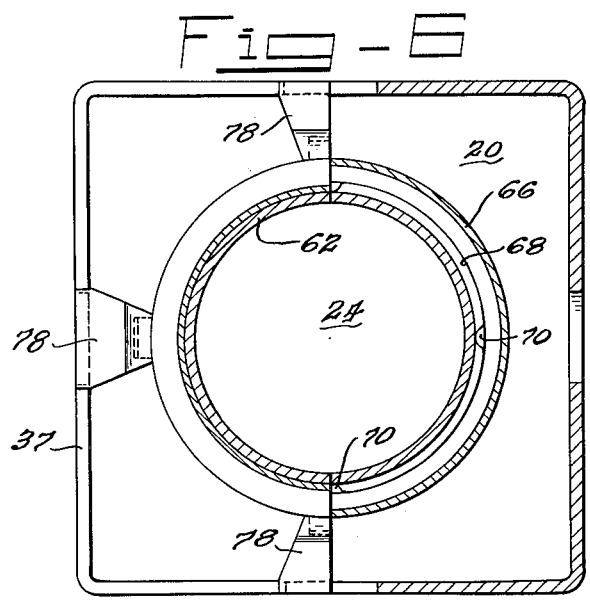
INVENTORS
Joseph M. Harrer
Leonard W. Fromm, Jr.
Verne M. Kolba United States Patent Office 3,049,487
Patented Aug. 14, 1962

3,049,487
DIRECT-CYCLE, BOILING-WATER NUCLEAR REACTOR
Joseph M. Harrer, Elmhurst, Leonard W. Fromm, Jr., Glen Ellyn, and Verne M. Kolba, Plainfield, Ill., assignors to the United States of America as represented by the United States Atomic Energy Commission
Filed May 6, 1960, Ser. No. 27,462
3 Claims. (Cl. 204—193.2)

This invention relates to direct-cycle, boiling-water nuclear reactors for atomic power plants, and more particularly to a new and novel fuel assembly and reactor arrangement for producing superheated steam within the reactor vessel.

A direct-cycle boiling water nuclear reactor is one in which fissioning of the nuclear fuel produces heat which boils water contained within the core of the reactor. The steam formed thereby may be conveyed to a turbogenerator to generate electricity. Untermyer Patent 2,936,273, dated May 10, 1960, describes a direct-cycle boiling water nuclear reactor which may be modified in accordance with the teachings of this invention to generate superheated steam within the reactor core.

The use of saturated steam to drive a turbine is extremely inefficient. In modern conventional central power plants, superheated steam is invariably employed since the thermal efficiency of the turbine increases with an increase in steam temperature.

The first proposals for superheating steam within a nuclear reactor core were made by Metcalf Patent 2,787,593, dated April 2, 1957, and Wigner Patent 2,806,820, dated September 17, 1957. In their reactor systems, however, water was heated within the reactor core and flashed into steam outside of the reactor vessel. The steam was then directed back into the reactor core where it was superheated. The systems described were not efficient steam producers since they were not boiling water reactors.

Subsequent to the invention of the boiling water reactor covered by the aforementioned Untermyer patent, it was proposed to boil the water and superheat the steam within the same reactor core as evidenced by Treshow Patent 2,938,845, dated May 31, 1960. In the Treshow system, water was boiled in the reactor tank exterior of the fuel elements. The resulting steam was piped out of the reactor tank and then reintroduced into the reactor core to channels within the fuel elements wherein the steam was superheated. Considerable piping and equipment was required to recirculate the saturated steam into the interior of the fuel elements in the active core.

Other proposals were made for producing and superheating steam within the same reactor core whereby the steam was produced in a particular portion of the core such as in a peripheral zone at the exterior of the core and superheated in a central zone. In these systems, it was the usual practice to produce the steam as the coolant flows through a steam producing zone of the core in one direction and superheat the steam as it passes through the superheating zone of the core in the opposite direction. Proper ducting was required between the steam producing zone and the steam superheating zone to provide for the necessary steam flow.

It will be noted in the previous systems that the steam producing and the steam superheating were each accomplished by a single pass through the reactor core.

It is accordingly an object of the present invention to provide a direct cycle boiling water nuclear reactor system and a fuel assembly therefor which produces superheated steam.

It is also an object of this invention to provide a boiling water reactor system and a fuel assembly therefor whereby steam is produced and superheated within the reactor core without routing the saturated steam outside the reactor vessel.

It is also an object of this invention to provide a boiling water reactor system and a fuel assembly therefor whereby the saturated steam is routed through at least two passes through the active portion of the reactor to produce superheated steam.

Other objects and advantages of this invention will become apparent upon further reading of this application.

This invention provides a boiling water reactor system having an active portion and a saturated steam chamber within a pressure vessel. The active portion is comprised of fuel assemblies having means defining a passage in communication at one end with the saturated steam chamber and extending through the active portion. A second passage within the fuel assembly extends through the active portion and is in communication with the first passage at its other end. Nuclear fuel containing bodies are disposed within the first and second passages at the active portion and means for receiving superheated steam are provided to the other end of the second passage.

The terms "water" and "steam" as used throughout the specification and claims will be understood to include both hydrogen oxide ($H_2O$) and deuterium oxide ($D_2O$). The term "materials fissionable by neutrons of thermal energy" includes, but is not restricted to U–233, U–235 and Pu–249.

The detailed description of this invention may best be understood with reference to the accompanying drawings wherein:

FIG. 2 is an elevation view of a superheater fuel assembly;

FIG. 3 is a vertical section of the lower portion of the superheater fuel assembly shown in FIG. 2;

FIG. 4 is a vertical section of the upper portion of the superheater fuel element shown in FIG. 2;

FIG. 5 is a horizontal section of the superheating fuel assembly taken along the line 5—5 of FIG. 4;

FIG. 6 is a horizontal section of the superheater fuel assembly taken along the line 6—6 of FIG. 4;

FIG. 7 is a plan view of a moderator element for the superheater fuel assembly;

FIG. 8 is a vertical section of the moderator element taken along the line 8—8 of FIG. 7.

Figure 1:
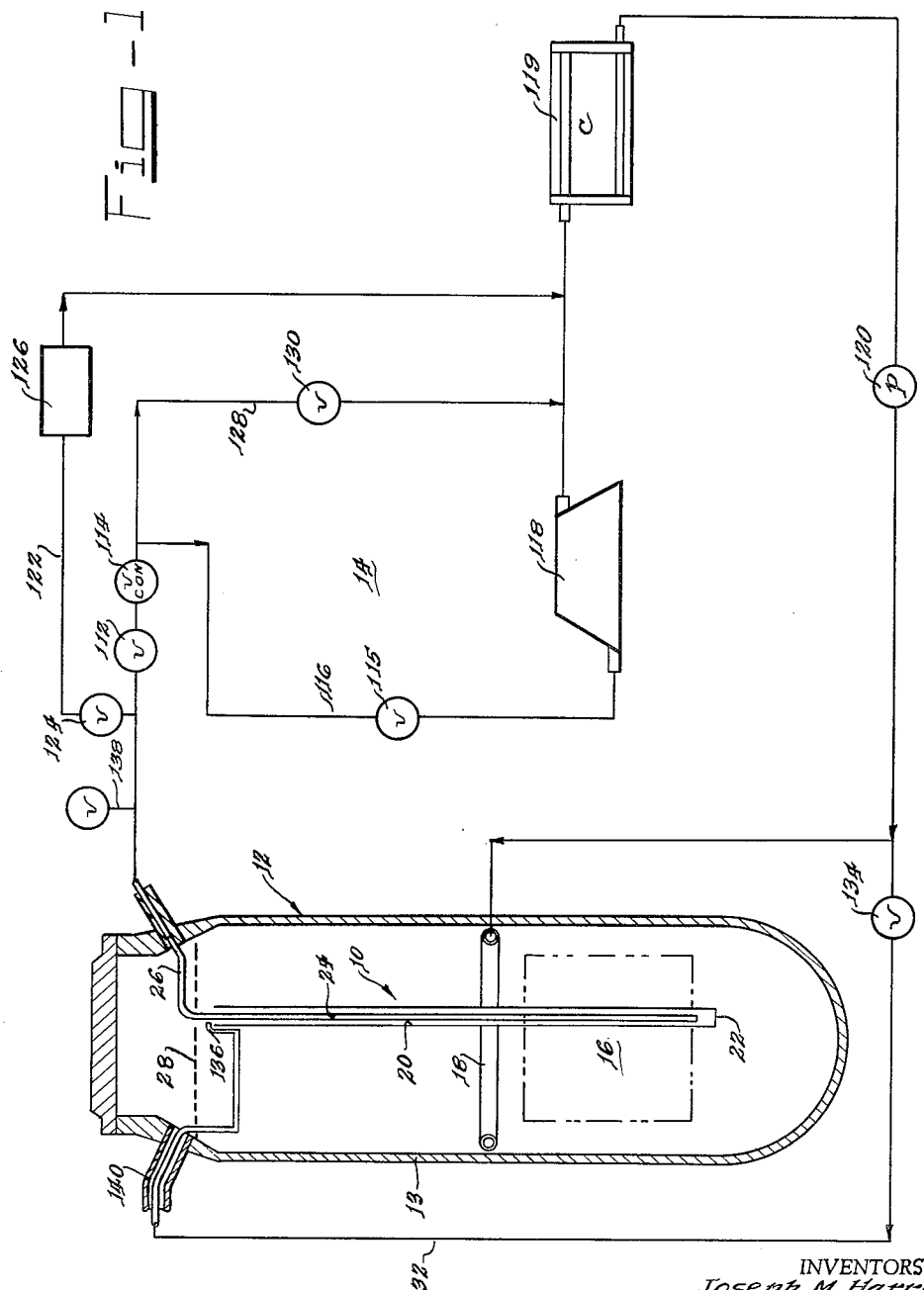
FIG. 1 is a schematic drawing of a superheater fuel assembly within a boiling water nuclear reactor and the associated superheating system.

Reference is now made to FIG. 1 wherein is shown a superheater fuel assembly 10 of the design embraced by this invention within a boiling water nuclear reactor 12. The fuel assembly 10 is shown within a pressure vessel 13 and connected to a steam cycle system 14 for converting the energy of the superheated steam to useful work as will be later described. The reactor 12 comprises an active portion 16 in which feed water introduced by the feed water distribution ring 18 is boiled. The steam formed thereby rises within the pressure vessel 13 and enters a downcomer channel 20 within the superheater fuel assembly 10 at its upper end. The saturated steam in the downcomer channel 20 is superheated as it passes through the active portion 16. The flow of the steam is reversed in direction as it reaches the closed end 22 of the superheater fuel assembly 10 and makes a second pass through the active portion 16 as it flows through the riser channel 24 in the superheater fuel assembly 10. The superheated steam is conducted from the upper end of the riser channel 24 to the steam cycle system 14 by a pipe 26. A manifold system would be used if a plurality of superheater fuel assemblies 10 are employed. Rather than a direct connection between the superheater assembly 10 and the steam cycle system 14, a diaphragm may traverse the interior of the pressure vessel 13 at the level of the dotted line 28 which would separate the interior of the pressure vessel 13 into a saturated steam chamber below the diaphragm and a superheated steam chamber above the diaphragm. The diaphragm would eliminate the complicated manifold system which would be required if a large number of superheater fuel assemblies 10 are interspersed throughout the reactor.

A superheater fuel assembly 10 is shown in FIGS. 2–8 which is designed specifically for use in the Experimental Boiling Water Reactor located at Argonne National Laboratory and described in the "Proceedings of the International Conference on the Peaceful Uses of Atomic Energy," vol. 3, United Nations, 1955. The assembly has a square cross-section and is adapted to replace a regular single-pass steam-producing fuel assembly in the active portion.

At the closed or lower end 22 of the superheater fuel assembly 10, FIG. 3, is a subassembly 30 adapted to secure the assembly within a positioning aperture 32 in the lower grid 34 of the reactor. The adaptor subassembly 30 comprises an end fitting 36 having a substantially square cross-section and forming a closure to the lower end of the square cross-section outer shroud 37 of the fuel assembly 10. The end fitting 36 has an intermediate portion 38 circular in cross-section and adapted to slidably receive the inner surface 40 of a collar 42 which positions the fuel assembly 10 within the aperture 32 in the grid 34. The end fitting 36 has a circular end portion 44 protruding through an aperture 46 in the end of the collar 40 and has a retainer ring 48 threaded to its end. A spring 50 surrounding the intermediate portion 38 of the end fitting 36 and engaging shoulder 51 normally constrains the collar 42 against the retainer ring 48. The bore 52 in the lower end of the fitting 36 and the outlets 54 at the upper end of the bore 52 provide passage for the flow of feed water from below the grid 34 to the space around the fuel assembly in the active portion of the reactor 12.

The adaptor subassembly 30 is designed as described to permit longitudinal expansion of the superheater fuel assembly. It will be noted in FIG. 1 that the top end is fixed in position because of the piping means to the steam cycle system, so that the assembly must be permitted to longitudinally expand downward.

The outer shroud 37 is seal-welded at its lower end to the end fitting 36 and extends upward through the active portion 16 of the reactor to a substantial height thereabove within the reactor vessel 13. Within the outer shroud 37 and axially aligned therewith is a second or inner shroud 56 which rests upon an X-shaped support 58 at its lower end. The inner shroud extends beyond the height of the outer shroud 37 at its upper end, FIG. 4, and is attached thereat to the pipe 26.

The inner shroud 56 is substantially square in cross-section and concentric with the outer shroud along the portion 60 extending through the active portion 16 of the reactor. The upper portion 62 of the inner shroud 56 is substantially circular in cross-section and an adaptor portion 64 serves to reduce the inner shroud 56 from the square to circular cross section. The interstice between the outer shroud 37 and the inner shroud 56 forms the downcomer channel 20 while the interior of the inner shroud 56 forms the riser channel 24. A sleeve 66 encircles the upper portion 62 of the inner shroud 56 forming an annulus therebetween. It extends substantially the length of the upper portion 12 and is welded at its upper end to the upper portion 62. The bottom end of the sleeve 66 is spaced from the inner shroud by four circumferentially spaced indentations 70 to provide an opening into the annulus 68. The annulus 68 provides a static steam insulation barrier between the saturated steam entering at the top of the downcomer channel 20 and the superheated steam in the riser channel 24.

The inner shroud 56 is centrally positioned within the outer shroud 37 by means of upper and lower spacer frames 74 and 76 respectively, and four inwardly extending projections 78 at the upper end of the outer shroud 37. The spacer frames 74 and 76 each comprise a number of corner components 80, FIG. 5, side components 82 which are welded to a square ring 84. The rings of both frames 74 and 76 engage and support the fuel elements 86 hereinafter described. The lower frame 76 is rigidly fixed by welding to the outer shroud 37, inner shroud 56 and the square cross support member 58. The upper frame 74, however, is fixed only to the inner shroud in order to provide for the differential longitudinal expansion of the fuel elements 86 and the shrouds. Within the interior of the inner shroud 56 and adjacent the active portion 16 of the reactor are additional fuel elements 86 supported at their upper and lower ends by transversely disposed bars 90 welded to opposite sides of the shroud 56.

The downcomer channel 20 between the inner and outer shroud 56 and 37 respectively, is open at the upper end between the projections 78 to receive saturated steam from the space above the active portion 16 in the pressure vessel 13 (FIG. 1). The steam pressure in the vessel is sufficient to cause the downward passage of the steam through the downcomer 20 of the superheat fuel assembly 10. The fuel elements 86 located in the downcomer adjacent the fuel elements within the inner shroud 56 pass additional heat to the saturated steam due to the fissioning of reactive material disposed therewithin. After the steam passes the active portion it is directed to the interior of the inner shroud forming the riser channel 24 for a second upward pass through the active portion for further superheating. The steam passing upward between the fuel elements 86 in heat exchange relationship therewith is additionally superheated due to the fissioning of the nuclear reactive material.

To compensate for the reduced moderation for fission neutrons passing through the central portion of the fuel assembly a square sectional moderator element 92 takes the place of the four centermost fuel elements within the inner shroud 56. The moderator element 92, FIGS. 7–8, comprises a body 94 containing a thermal neutron moderating material such as beryllium or zirconium hydride ($Zr \cdot H_{1.4-1.8}$) clad in a noncorrosive jacket 96. The end pieces 98 of the surrounding jacket have fittings 100 attached thereto which are slotted and aligned to fit the transverse bars 90 at their upper and lower ends.

The fuel elements 86 are each of the pin-type having a body 102 containing material fissionable by thermal neutrons such as U–235, U–233, or Pu. The body 102 is encased in a jacket 106 which is closed at both ends by fittings 108 adapted to engage the square ring 84 in the downcomer channel 20 or the transverse bars 90 in the riser channel 24 in the inner shroud 56. Alternately positioned fuel elements 86 within the inner shroud 56 have spirally wound wires 109, FIGS. 3 and 5, serving to maintain spacing between the elements and direct the flow of steam around the elements.

Additional neutron moderating material is contained within the four elements 110 positioned adjacent the corners of the central moderating element 92. These moderating elements are identical to the fuel containing elements 86 except that the body is fabricated of a moderating material such as beryllium or zirconium hydride. Two of the moderating elements 110 are provided with spiral windings for the same purpose hereinbefore mentioned for the fuel elements 86 in the interior of the inner shroud 56.

Reference is again made to FIG. 1 for an explanation of the operation of the superheater fuel element 10 in a complete reactor system for the production of useful power. The steam cycle system 14 shown therein is a basically conventional one wherein a stopvalve 112, a control or inlet valve 114, and a turbine isolation valve 115 are series connected in the steam feed line 116 to the turbine generator 118. The stopvalve is a safety check designed to shut off the steam to the turbine automatically responsive to the presence of a damaging condition in the electrical system. The inlet valve is an manually controllable device which may be adjusted to control the amount of steam furnished to the turbine according to the requirements of the system. The turbine isolation valve 115 is used in starting the reactor system as hereinafter described.

The outlet of the turbine 118 connects to a condenser 119 wherein the steam is reconverted to feedwater. A pump 120 is connected between the condenser 119 and the reactor 12 for returning the feed water to the reactor through the distribution ring 18. A turbine bypass line 122 with a bypass valve 124 and a desuperheater 126 is provided to automatically route the superheated steam in the event the stopvalve 112 closes to stop the steam turbine 118. Another bypass 128 with valve 130 is provided directly around the turbine 118 which is used to bypass a portion of the steam during reduced power operation. It is also used in the start-up procedure as hereinafter described.

A superheater fuel assembly flood line 132 connects the discharge end of pump 120 through a valve 134 to a nozzle 136 at the open upper end of the downcomer channel 20 in the fuel assembly 10. The decay heat produced by the fissioning from delayed neutrons after shut-down of the reactor require that the superheater assembly be flooded. If this were not done, the decay heat could possibly cause serious damage through melt-down of the fuel elements in the superheater fuel assembly. A vent-line 138 is connected between the steam outlet 26 and the main reactor pressure vessel outlet 140 to facilitate the flooding of the channels in the superheater fuel element. It provides an escape for the latent steam forced out of the channels by the flooding water after the system has been shut down.

When the reactor is shut down, the superheater fuel elements are flooded and the vent-line 138 is opened. All other valves are closed. To initiate operation of the system the start-up heating is carried out as per standard procedure outlined in the aforementioned reference describing the Experimental Boiling Water Reactor. With the boiling system hot and pressurized, it is capable of producing steam for the superheater. The vent-line 138 is then closed, the turbine isolation valve 115 is closed and the turbine bypass valve 130 is fully opened. The superheater fuel elements are now ready to be drained and inlet valve 114 is slowly opened. Initially, the fluid passing through the inlet valve 114 is a mixture of steam and water, the steam of the mixture is produced by the water flashing due to the pressure drop. When the superheater downcomer is drained, there will be additional steam mixed with the water which will help purge the water in the riser channel 24. In addition this steam will add heat to the water by virtue of its superheat attained by the pressure drop through the active portion 16. When superheated steam is reaching the inlet valve 114 the isolation valve is opened and the turbine bypass valve 130 closed. The inlet valve is in control of the steam flow to the turbine so that it may be set to the position desired for operation. The system is now ready and the reactor is brought up to power as per the standard procedure.

The foregoing has been a description of one embodiment of the invention. A skilled artisan would readily recognize adaptations and modifications which might still embrace the basic concepts of this invention. For example, the pin-type fuel elements might be eliminated and the neutron fissionable fuel might be contained in and form a part of the inner and outer shrouds. Many other modifications are clearly forseeable and, therefore, it is the intent of the inventors to be bound only by the scope of the appended claims.

What is claimed is:

1. A boiling-water reactor comprising a closed vessel containing water; and an array of spaced vertical fuel assemblies positioned in the vessel so as to be immersed in the water for converting the water to saturated steam and for receiving the saturated steam internally to convert it to superheated steam, each fuel assembly comprising a vertical outer tube open at its upper end and closed at its lower end, a vertical inner tube positioned in the outer tube in radially spaced relation thereto so as to form therewith an annular channel, the lower end of the inner tube being open and spaced from the lower closed end of the outer tube so as to provide a path for flow of steam from the channel between the tubes to the interior of the inner tube, a first plurality of vertical nuclear-fuel rods distributed in spaced relation to one another about the annular channel between the tubes, a second plurality of vertical nuclear-fuel rods positioned in the inner tube in spaced relation to one another, means providing an inlet for the saturated steam in the upper region of the closed vessel to the upper end of the channel between the tubes, and means for conducting superheated steam from the upper end of the inner tube to the exterior of the closed vessel.

2. The boiling-water reactor specified in claim 1, each assembly further comprising a vertical moderator element centrally positioned in the inner tube in spaced relation to the fuel rods therein.

3. The boiling-water reactor specified in claim 1, the tubes of each assembly being of square section, each assembly further comprising a vertical moderator element of square section centrally positioned in the inner tube in spaced relation to the fuel rods therein, and four vertical rods positioned in the inner tube just beyond the corners of the square moderator element in spaced relation thereto and to the fuel rods in the inner tube.

References Cited in the file of this patent

UNITED STATES PATENTS

| | | |
|---|---|---|
| 2,938,845 | Treshow | May 31, 1960 |
| 2,999,059 | Treshow | Sept. 5, 1961 |

FOREIGN PATENTS

| | | |
|---|---|---|
| 1,023,828 | Germany | Feb. 6, 1958 |
| 1,051,425 | Germany | Feb. 26, 1959 |
| 1,055,141 | Germany | Apr. 16, 1959 |
| 1,211,585 | France | Oct. 12, 1959 |

UNITED STATES PATENT OFFICE
CERTIFICATE OF CORRECTION

Patent No. 3,049,487                      August 14, 1962

Joseph M. Harrer et al.

It is hereby certified that error appears in the above numbered patent requiring correction and that the said Letters Patent should read as corrected below.

Column 6, lines 45 and 46, after "vertical" insert -- moderator --.

Signed and sealed this 6th day of August 1963.

(SEAL)
Attest:

ERNEST W. SWIDER
Attesting Officer

DAVID L. LADD
Commissioner of Patents